(12) United States Patent
Tse et al.

(10) Patent No.: US 9,361,049 B2
(45) Date of Patent: Jun. 7, 2016

(54) SYSTEMS AND METHODS FOR APPEARANCE-INTENT-DIRECTED DOCUMENT FORMAT CONVERSION FOR MOBILE PRINTING

(75) Inventors: Francis K. Tse, Rochester, NY (US); Jason Slack, Victor, NY (US); James Mayer, Rochester, NY (US); Robert Nuuja, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 230 days.

(21) Appl. No.: 13/286,643

(22) Filed: Nov. 1, 2011

(65) Prior Publication Data
US 2013/0111335 A1 May 2, 2013

(51) Int. Cl.
*G06F 17/00* (2006.01)
*G06F 3/12* (2006.01)
*G06F 17/24* (2006.01)
(Continued)

(52) U.S. Cl.
CPC .............. *G06F 3/1208* (2013.01); *G06F 3/122* (2013.01); *G06F 3/1244* (2013.01); *G06F 3/1287* (2013.01); *G06F 3/1292* (2013.01); *G06F 3/1204* (2013.01); *G06F 3/1205* (2013.01); *G06F 3/1241* (2013.01); *G06F 3/1243* (2013.01); *G06F 3/1288* (2013.01); *G06F 3/1296* (2013.01); *G06F 17/211* (2013.01); *G06F 17/212* (2013.01); *G06F 17/2247* (2013.01); *G06F 17/24* (2013.01); *G06F 17/30011* (2013.01)

(58) Field of Classification Search
CPC ... G06F 3/1241; G06F 3/1247; G06F 3/1243; G06F 3/1298; G06F 3/1296; G06F 3/1292; G06F 3/1254; G06F 3/1297; G06F 17/24; G06F 11/0739; G06F 11/0742; G06F 17/30011; G06F 17/212; G06F 17/211; G06F 17/30905; G06F 17/2247; G06F 3/1204; G06F 3/1206; G06F 3/1288
USPC ........ 715/204, 273–274; 358/1.15, 1.9; 718/1
See application file for complete search history.

(56) References Cited

U.S. PATENT DOCUMENTS

2004/0218209 A1* 11/2004 Hamaguchi et al. ......... 358/1.15
2009/0122343 A1* 5/2009 Nishitani ..................... 358/1.15
(Continued)

OTHER PUBLICATIONS

Riofrio, Melissa et al., "Print from anywhere to one of HP's ePrint-enabled printers by sending the job via e-mail", Macworld, Feb. 9, 2011, http://www.macworld.com/article/157328/2011/02/hpeprint.html.

(Continued)

*Primary Examiner* — Quoc A Tran
(74) *Attorney, Agent, or Firm* — MH2 Technology Law Group, LLP

(57) ABSTRACT

An embodiment generally relates to systems and methods for determining a conversion location based on the content of a document and an intended quality level of the document. More particularly, processing logic can be configured to analyze a document submitted for rendering to determine a content level of the document. Further the processing logic can compare the content level to an intended quality level specified by a user of the document to determine whether to convert the document on local resources or in a cloud-based network. An associated conversion application in the appropriate location can convert the document into a printable format, and a print engine can render the converted document.

11 Claims, 5 Drawing Sheets

(51) Int. Cl.
*G06F 17/22* (2006.01)
*G06F 17/21* (2006.01)
*G06F 17/30* (2006.01)

(56) References Cited

U.S. PATENT DOCUMENTS

2009/0299905 A1* 12/2009 Mestha et al. .................. 705/76
2010/0321718 A1* 12/2010 Mihira .......................... 358/1.14
2011/0235085 A1* 9/2011 Jazayeri et al. .............. 358/1.14
2012/0026538 A1* 2/2012 Miyata ......................... 358/1.15
2012/0087596 A1* 4/2012 Kamat et al. .................. 382/254
2013/0222618 A1* 8/2013 Chang et al. ................ 348/207.2
2014/0368859 A1* 12/2014 Gutnik et al. ................ 358/1.14

OTHER PUBLICATIONS

Muscolino, Holly, "The Mobile Business Printing Landscape; Assessing the Opportunity", IDC #228220, May 2011, vol. 1, pp. 1-11.

* cited by examiner

SYSTEMS AND METHODS FOR APPEARANCE-INTENT-DIRECTED DOCUMENT FORMAT CONVERSION FOR MOBILE PRINTING

FIELD OF THE INVENTION

This invention relates generally to imaging and, more particularly, to efficiently determining how to convert a document for printing.

BACKGROUND OF THE INVENTION

As devices and applications are becoming more mobile, the need to remotely print documents is increasing. In particular, users may desire to submit a document from a mobile device for printing on a print engine or similar printing device. For example, a user may desire to print an attachment from an email, a file downloaded from a secure server, and/or a document composed or updated from the mobile device.

In submitting documents for printing from mobile devices, the documents need to be converted into a printable format that is recognized by the print engine. In particular, the document can be converted by local print drivers, such as those on the mobile device or the print engine, or by remote print drivers, such as those on a cloud-based network or in other locations. However, local conversion drivers lack the processing power necessary to handle and/or accurately convert all of the features of the document. For example, Microsoft® (MS) Office® documents can have many associated features that need to be converted for accurate depiction of the document. Further, although remote print drivers may be more powerful converters, using the remote print drivers can be time consuming and/or costly.

There are shortcomings with current techniques for submitting documents from a mobile device for rendering on a print engine. In particular, a user must specify either a local or a remote conversion of the document based on preference, output quality, speed, cost, and/or other factors. However, the user may not comprehend how the printed document will be rendered based on either a local or remote conversion. Therefore, the user may need to re-submit a print job if the printed document is undesirable. Further, the user may needlessly waste time, quality, cost, and/or other resources specifying a high-quality conversion when a lower-quality conversion would be sufficient.

Therefore, it may be desirable to have systems and methods for efficiently converting a document for printing. More particularly, it may be desirable to have platforms and techniques for determining a conversion location based on the content of a document and an intended quality level of the document.

SUMMARY

An embodiment generally relates to a method of processing documents. According to embodiments, the method comprises analyzing a document associated with a mobile device to determine a content level associated with the document and detecting an intended quality level relating to rendering the document. Further, the method comprises comparing the content level to the intended quality level and determining, by a processor and based on the comparison, where to convert the document into a printable format.

Another embodiment pertains generally to a system for processing documents. The system comprises a mobile device configured to access a document and a print engine configured to render a printable version of the document. Further, the system comprises a processor configured to interface with the mobile device and the printer. The processor is configured to perform actions comprising analyzing the document to determine a content level associated with the document, and detecting an intended quality level relating to rendering the document by the print engine. Further, the processor is configured to perform actions comprising comparing the content level to the intended quality level, and determining, based on the comparison, where to convert the document into the printable format.

An additional embodiment generally relates to a computer readable storage medium that comprises instructions for causing a computer to analyze a document associated with a mobile device to determine a content level associated with the document, and detect an intended quality level relating to rendering the document. Further, the computer compares the content level to the intended quality level, and determines, based on the comparison, where to convert the document into a printable format.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1A:
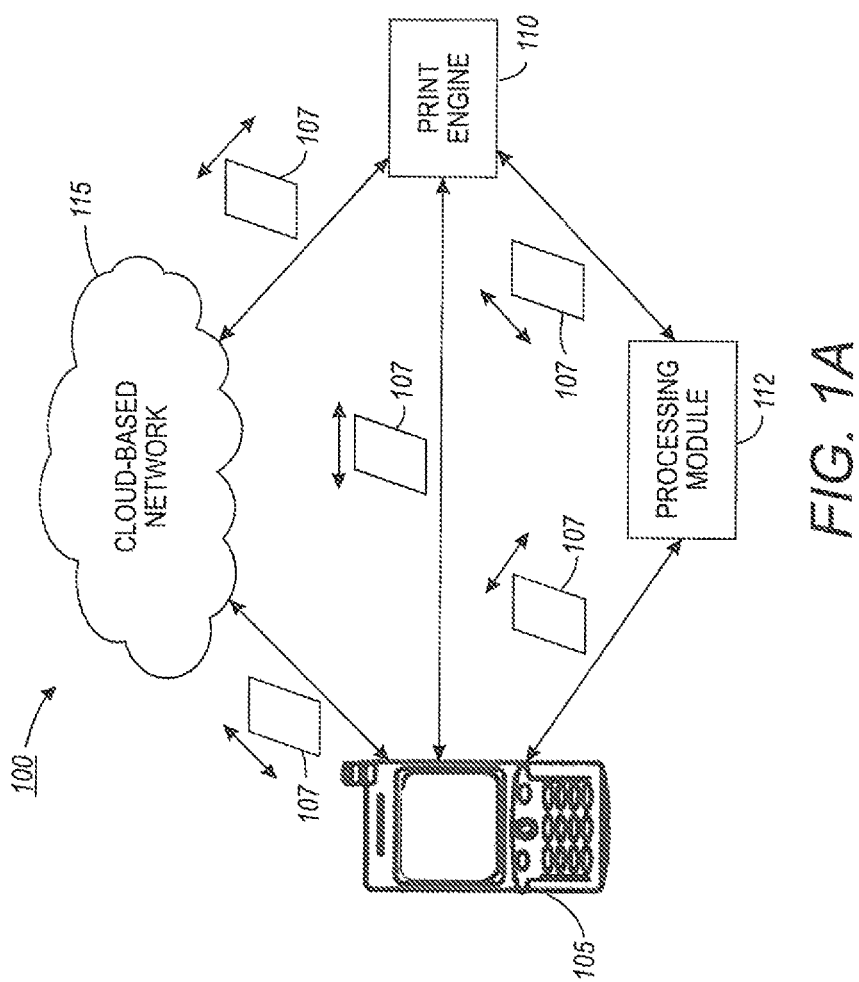
FIG. 1A illustrates an exemplary environment comprising components configured to implement the systems and methods in accordance with embodiments.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

As used herein, a "cloud" or "cloud-based network" can comprise a collection of hardware, software, services, and/or resources that can be invoked to instantiate a virtual machine, process, or other resource for a limited or defined duration. In embodiments, the cloud-based network can be a public cloud or a private cloud. More particularly, the cloud-based network can be inside or outside a firewall associated with a local area network and/or other networks. Further, as used herein, a "mobile device" can refer to any type of device or resource configured for mobile or remote usage or operation such as, for example, a cellular phone, smart phone, tablet computer, notebook computer, personal digital assistant (PDA), and/or other similar devices.

Still further, as used herein, a "print engine" can refer to any type of hardware or combination of hardware and software that can be configured to print or render a document onto a substrate. For example, a print engine can receive an electronic document in a printable format and render the document onto a paper substrate. Further still, as used herein, a "converter" can refer to any type of hardware, software, or combination thereof that can be configured to convert an electronic file or document in a first format into another electronic file or document in a second format.

Embodiments generally relate to systems and methods for determining a conversion location based on the content of a document and an intended quality level of the document. More particularly, a user accessing a mobile device can select a document to be rendered on an associated print engine. Further, the user can specify an intended quality level associated with the rending of the document. In embodiments, logic associated with the systems and methods as described herein can analyze the document to determine a content level of the document. Further, the logic can compare the content level of the document to the intended quality level specified by the user to determine whether the document should be converted locally (e.g., on the mobile device, print engine, or another local resource) or in a cloud-based network. The logic can initiate a conversion of the document into a printable format according to the comparison, and the print engine and render the converted document.

FIG. 1 depicts an exemplary environment 100 in which the present embodiments can be implemented. It should be readily apparent to one of ordinary skill in the art that the environment 100 depicted in FIG. 1 represents a generalized schematic illustration and that other components and/or entities can be added or existing components and/or entities can be removed or modified.

As shown in FIG. 1, the environment 100 can comprise a mobile device 105 and a print engine 110. The mobile device 105 can be configured to connect to the print engine 110, and vice-versa, via any type of wired or wireless data network or other communication channel. The environment 100 can further comprise a cloud-based network 115 that can be configured to connect to the mobile device 105 and the print engine 110 via any type of wired or wireless data network or other communication channel.

According to embodiments, a user can use the mobile device 105 to access one or more documents 107 stored on or otherwise available on the mobile device 105. For example, the user can download or open a word-processed document attached to an email. For further example, a user can create a new document or update an existing document using the mobile device 105. The user can desire to submit the document 107 from the mobile device 105 for rendering on the print engine 110. In embodiments, the user can submit the document 107 for printing via any type of submission platform or technique. For example, the user can submit the job to the print engine 110 via an email attachment (e.g., Hewlett-Packard® ePrint®, Xerox® Cloud Print®, direct email, etc.), universal serial bus (USB) print, direct web submission from the mobile device 105, Wi-Fi Ad Hoc or Wi-Fi Direct, and/or others.

Before the document 107 is rendered on the print engine 110, the document 107 can be converted into a printable format. For example, the document 107 can be a Microsoft® Office® document, such as Word®, Powerpoint®, or Excel®, that can need to be converted into a printable format such as PCL, PS, PDF, JPEG, XPS, and/or others, to be properly interpreted by the print engine 110. It should be appreciated that other formats of the document 107, other printable formats, as well as any conversion techniques between any of the formats are envisioned.

According to embodiments, the conversion of the document 107 can be performed on the mobile device 105, on the print engine 110, or in the cloud-based network 115 by a converter such as, for example, a driver, application, and/or other similar hardware and/or software platforms or techniques. It should be appreciated that a third-party resource, such as a processing module 112 as shown in FIG. 1, can also comprise a converter to convert documents into printable formats. In embodiments, the processing module 112 can be any type of computing client, module, or resource capable of executing a converter, as described herein.

Figure 1B:
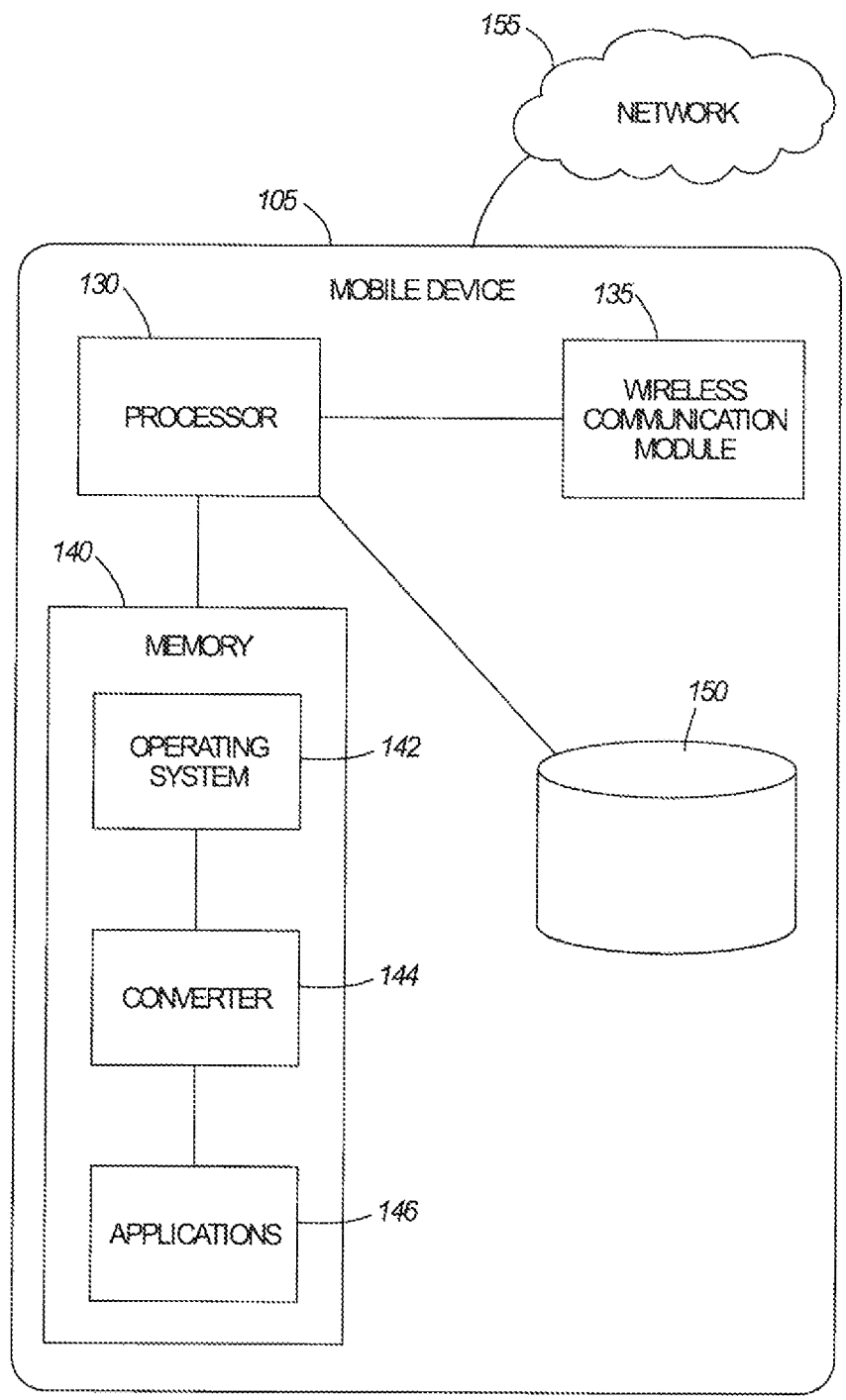
FIG. 1B illustrates a hardware diagram in accordance with embodiments.

Referring to FIG. 1B, depicted is an exemplary mobile device 105 comprising components thereof. Even though FIG. 1B depicts the components of the mobile device 105, it should be appreciated that the print engine 110, the processing module 112, and/or the cloud-based network 115 can comprise the same or similar components. Further, it should be appreciated that FIG. 1B represents a generalized schematic illustration and that other components and/or entities can be added or existing components and/or entities can be removed or modified.

As shown in FIG. 1B, the mobile device 105 can comprise a processor 130 communicating with a memory 140, such as electronic random access memory, or other forms of transitory or non-transitory computer readable storage mediums, operating under control of or in conjunction with an operating system 142. The operating system 142 can be any commercial, open-source, or proprietary operating system or platform. The processor 130 can communicate with a database 150, such as a database stored on a local hard drive. While illustrated as a local database in the mobile device 105, the database 150 can be separate from the mobile device 105.

The processor 130 can further communicate with a wireless communication module 135, such as a wired or wireless data connection, which in turn communicates with a network 155, such as GSM, CDMA, and/or the like, as well as the Internet or other public or private networks. The processor 130 can also communicate with a converter 144 that can be configured to convert documents into printable formats, or other formats, as discussed herein. Further, the processor 130 can also communicate with a set of applications 146 that can be configured to execute control logic and perform data processing to perform the functions and techniques as discussed herein. For example, the application 146 can comprise executable code configured to determine whether to convert the document 107 locally or in the cloud-based network 115, as discussed herein. It should be appreciated that other applications 146 and functionalities are envisioned.

While FIG. 1B illustrates the mobile device 105 as a standalone system comprising a combination of hardware and software, the components of the mobile device 105 can also be implemented as a software application or program capable of being executed by a conventional computer platform. Likewise, the components of the mobile device 105 can also be implemented as a software module or program module capable of being incorporated in other software applications and programs. In either case, the components of the mobile device 105 can be implemented in any type of conventional proprietary or open-source computer language.

Referring back to FIG. 1A, in embodiments, the converters on or in the mobile device 105, the print engine 110, the processing module 112, and the cloud-based network 115 can be characterized, classified, and/or the like based on how well or accurately the converters are able to convert various features of the document 107. For example, one level of converter ("level one") can support features such as, for example, breaks, fonts, bullets and numbering, page setup, Powerpoint® alignment, fields and columns, paragraph formats, and/or others. Further, another level of converter ("level two") can support the features of the level one converter, plus other features such as, for example, XLS print, XLS charts, pictures, background, word art, and/or others. Still further, an additional level of converter ("level three") can support the features of both the level one and level two converters, plus other features such as, for example, comments, track changes, add-ins/plug-ins, and/or other. It should be appreciated that these possible converter levels are merely exemplary, and that other levels with different features and/or other considerations are envisioned. Further, the converter levels and associated features can correspond to new or existing specifications such as, for example, the specifications of Version 1.0 of the DirectOffice™ converter from Zoran®, and/or others.

The respective converters of the mobile device 105, the print engine 110, the processing module 112, and the cloud-based network 115 can have advantages and drawbacks. In embodiments, the converter(s) on the mobile device 105, the print engine 110, and/or the processing module 112 can process conversions quickly and can be cost-effective. However, the converter(s) on the mobile device 105, the print engine 110, and/or the processing module 112 can accurately or properly convert some, but not all, of the features or contents of the document 107. For example, the converter(s) on the mobile device 105, the print engine 110, and/or the processing module 112 can be those classified as either "level one" or "level two," as discussed herein. As a result, the output files from these converter(s) can sometimes not reflect the rendering intent of the document 107. For example, a Powerpoint® presentation file or an Excel® spreadsheet in a printable format, when output by a local converter (e.g. the converter(s) on the mobile device 105, the print engine 110, and/or the processing module 112) can lack some of the features or the original, underlying document. Therefore, the rendered version of the file may prove unsuitable.

In contrast, the converter in the cloud-based network 115 can be configured to convert most or all of the features or contents of the document 107 (e.g., the converter in the cloud-based network 115 can be that classified as "level three," as discussed herein), but the processing time and power required to transmit the document 107 to the cloud-based network 115 can impact speed and costs. For example, a provider of the cloud-based network 115 can charge a fee or institute other payment techniques for use of the converter in the cloud-based network 115. For further example, the time required to transmit the document 107 to and from the cloud-based network 115 can be significant and can impact other functions. In operation, a user may not want to incur the costs or time to convert a document in the cloud-based network 115 if the appearance of the document is not important, if the document merely contains text, or in other cases. Therefore, the decision of whether to convert the document 107 locally (e.g., a conversion on the mobile device 105, the print engine 110, or the processing module 112) or remotely (e.g., in the cloud-based network 115) can be important.

Accordingly, a user, system administrator, or other individual can desire to be provided with a decision of either a local conversion or a remote conversion of the document 107, based on considerations such as output quality, speed, cost, and/or others. According to embodiments, logic on or processing modules implemented in the mobile device 105, the print engine 110, and/or the processing module 112 can be configured to analyze the document 107, as well as an intended quality level, to determine whether the document 107 should be converted locally or remotely. The intended quality level can be a default quality level, can be inputted by a user, or can be set via other techniques. For example, the user can interface with an application on the mobile device 105 to input or set the intended quality level.

More particularly, the intended quality level for a rendering of the document 107 can be any type of level or characterization associated with the desired quality, features, or content of the document to be rendered by the print engine 110. For example, the possible intended quality levels can be "Functional," "Normal Office," and "Presentation." More particularly, the "Functional" quality level can be desired for text-only documents, or for documents needed for information purposes; the "Normal Office" quality level can be desired for normal-usage documents, such as, for example, documents that need review and/or updating, and that can properly depict some, but not all, of the features of the underlying document; and the "Presentation" quality level can be desired for documents that need to match most or all of the features of the underlying document. It should be appreciated that these possible intended quality levels are merely exemplary, and that other quality levels with different requirements, usages, and/or other considerations, are envisioned.

In analyzing the document 107, the logic on or processing modules implemented in the mobile device 105, the print engine 110, and/or the processing module 112 can be configured to analyze the document 107 to determine a content level of the document 107. More particularly, the analyzing logic or modules can examine the document 107 to determine the features of the document, such as those discussed herein. In embodiments, a content parser module, application, or algorithm can identify the features of the document 107. Further, the analyzing logic or modules can assign a content level to the document 107 based on the features of the document 107.

The content levels of the document 107 can be any type of level or characterization associated with the complexity of the features or content of the document 107. For example, the possible content levels can be "Level A," "Level B," and "Level C." More particularly, the "Level A" content level can correspond to a document that has features from the "level one" converter level; the "Level B" content level can correspond to a document that has features from the "level two" converter level; and the "Level C" content level can correspond to a document that has features from the "level three" converter level, as discussed herein. It should be appreciated that these possible content level are merely exemplary, and that other content levels with different combinations, requirements, usages, and/or other considerations, are envisioned, including assigning content levels based on overlapping features from the converter levels as discussed herein.

According to present embodiments, the logic on or processing modules implemented in the mobile device 105, the print engine 110, and/or the processing module 112 can be configured to compare the identified content level of the document 107 to the intended quality level that was preset or specified by the user or other entities. In particular, the logic or modules can examine a conversion table or similar data structure to identify a decision about whether it is beneficial to convert the document 107 either locally (e.g., on the mobile device 105, the print engine 110, or the processing module 112) or in the cloud-based network 115.

Figure 2:
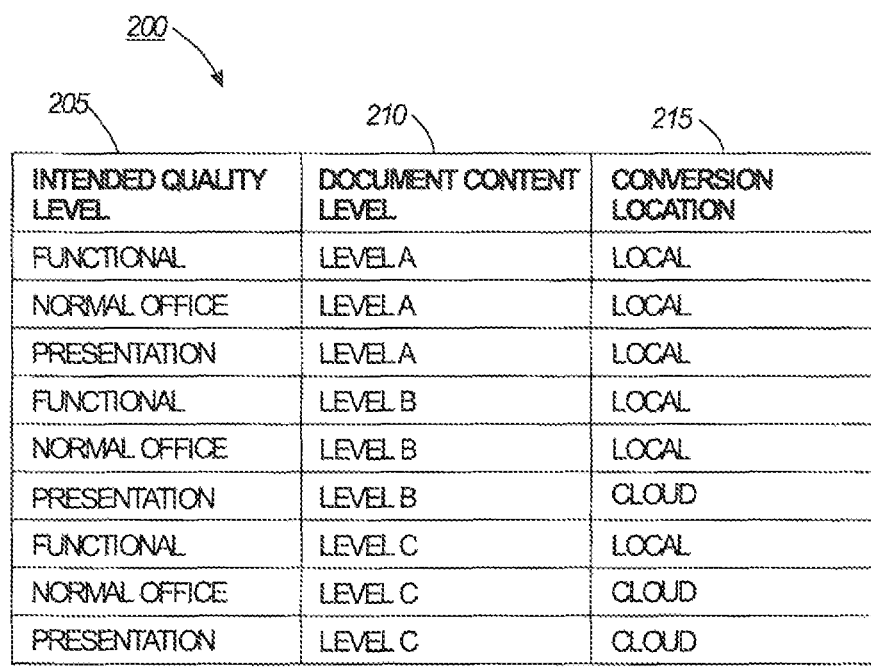
FIG. 2 is an exemplary table in accordance with embodiments.

Referring to FIG. 2, depicted is an exemplary conversion table 200 that can be used by components to identify a decision about whether to convert the document 107 locally or in the cloud-based network 115. It should be appreciated that the conversion table 200 and data thereof as depicted in FIG. 2 is merely exemplary and can be organized in various ways with various data.

As shown in FIG. 2, the conversion table 200 can comprise an intended quality level column 205, a document content level column 210, and a conversion location column 215. More particularly, the intended quality level column 205 comprises exemplary intended quality levels (e.g., "Functional," "Normal Office," and "Presentation"), as input by a user, set as a default, or set via other channels. Further, the document content level column 210 comprises exemplary document content levels (e.g., "Level A," "Level B," and "Level C"), as determined by the components of the mobile device 105, the print engine 110, or the processing module 112. In embodiments, the document content levels can be determined from analyzing the features of the document 107, as discussed herein.

The conversion location column 215 can comprise identifications of where the conversion of the document 107 should take place (e.g., "Local" or "Cloud") based on the corresponding intended quality level and the document content level. In embodiments, the conversion locations can be set by a user, administrator, or other individual, or can be determined by any type of logic, application, and/or the like. For example, as shown in FIG. 2, if the intended quality level is "Functional" and the document content level is "Level A," then the conversion table 200 indicates that the conversion should take place locally (e.g., on the mobile device 105, the print engine 110, or the processing module 112). For further example, as shown in FIG. 2, if the intended quality level is "Presentation" and the document content level is "Level B," then the conversion table 200 indicates that the conversion should take place in the cloud-based network 115.

Referring back to FIG. 1A, in embodiments, any of the components or entities of the environment 100 can institute one or more security policies or requirements related to the functionality as described herein. More particularly, security policies related to the conversion of the document 107 can be examined prior to converting the document into a printable format. For example, a document-based security policy can be implemented in which certain types of documents (e.g., spreadsheet files, presentation files, or others) can be limited to either a local conversion or a conversion in the cloud-based network 115. Further, the document-based security policy can list document file names corresponding to files that can be limited to either a local conversion or a conversion in the cloud-based network 115. For further example, a user-based security policy can be implemented in which specified users (e.g., officers, executives, specific users, and/or other individuals or groups of individuals) can be limited to converting documents either locally or in the cloud-based network 115. It should be appreciated that other security policies and implementations of security policies are envisioned. For example, a security policy can require authorization credentials (e.g., security certificates, permissions, and/or other credentials) to be sent or received among the components of the environment 100. Further, the security policies can be implemented for any or all of the components of the environment 100. Still further, the security policies can specify any type of document type or name, or any type of user or other individual.

In operation, a security policy examination can be implemented before or after the conversion decision is determined. For example, if an examination of the conversion table 200 results in identifying the cloud-based network 115 for the conversion of the document 107, but a security policy indicates that the user attempting to convert the document 107 is limited to converting the document 107 locally, then processing can override the result of the conversion table 200 and processing can mark the document 107 to be converted locally. Similarly, for example, if an examination of the conversion table 200 results in identifying a local conversion for a spreadsheet document, but a security policy indicates that spreadsheet documents are to be converted in the cloud-based network 115, then processing con override the result of the conversion table 200 and processing can mark the spreadsheet document to be converted in the cloud-based network 115. It should be appreciated that other modifications and overrides based on the conversion decision determination and any applicable security policies are envisioned.

Once the conversion location is identified or determined, for example from the conversion table 200, and any applicable security policies are examined, the components in the mobile device 105, the print engine 110, and/or the processing module 112 can be configured to either convert the document 107 or transmit the document 107 to the appropriate entity of the environment 100. For example, if an application on the mobile device 105 determines that the document 107 should be converted locally, and specifically on the mobile device 105, then a converter on the mobile device 105 can proceed to convert the document 107. For further example, if an application on the mobile device 105 determines that the document 107 should be converted locally, and specifically on the print engine 110, then the mobile device 105 can be configured to transmit the document 107 to the print engine 110 for conversion on the print engine 110. Further, for example, if an application on the print engine 110 determines that the document 107 should be converted in the cloud-based network 115 (for example, after the print engine 110 receives the document 107 from the mobile device 105), then the print engine 110 can be configured to transmit the document 107 to the cloud-based network 115 for conversion in the cloud-based network 115. It should be appreciated that the document 107 can be transmitted among all of the entities of the environment 100, as depicted in FIG. 1A, depending on various factors such as, for example, locations of analysis applications and converting applications, and results of the conversion location determinations.

Once the document 107 has been converted to a printable format by the appropriate entity of the environment 100, then that entity can be configured to transmit or otherwise provide the converted document to the print engine 110 for printing, rendering, and/or the like. For example, if the mobile device 105 converts the document 107 to a printable format, then the mobile device 105 can transmit the converted document to the print engine 110. For further example, if the cloud-based network 115 converts the document 107 to a printable format, then the cloud-based network 115 can transmit the converted document to the print engine 110. Once the print engine 110 receives the converted document, the print engine 110 can print or render the document based on the specifications of the converted document.

Figure 3:
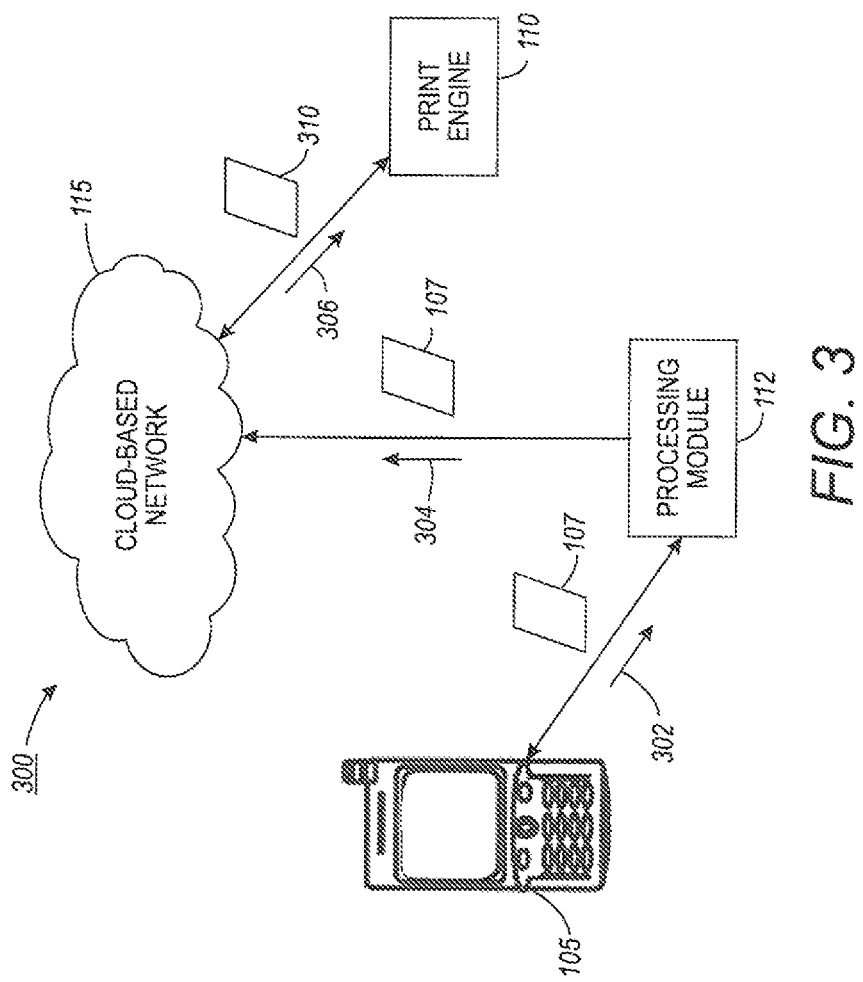
FIG. 3 illustrates an exemplary progression of a document through various components in accordance with embodiments.

Referring to FIG. 3, depicted in an exemplary progression of the document 107 through an environment 300. In particular, FIG. 3 depicts the document 107 progressing through the environment 100 from the mobile device 105 for rendering by the print engine 110. It should be appreciated that FIG. 3 is merely exemplary and other progressions are envisioned.

As depicted in FIG. 3, a user of the mobile device 105 can access the document 107 and select a procedure that initiates a rendering of the document 107. Further, the user can input an intended quality level for the rendered document, as discussed herein. If a conversion decision application of the processing module 112 is to be used to determine where to convert the document 107, then the mobile device 105 can transmit the document 107 to the processing module 112, as shown as in FIG. 3 as 302.

Upon receipt of the document 107, the processing module 112 can execute the conversion decision application to determine where to convert the document 107 into a printable format. More particularly, the conversion decision application can analyze the document 107 to determine the content level, and compare the content level to the intended quality level to determine where to convert the document 107. For example, if the conversion decision application determines that the document 107 is to be converted in the cloud-based network 115, then the processing module 112 can transmit the document 107 to the cloud-based network 115, as shown in FIG. 3 as 304. In embodiments, the processing module 112 can examine any applicable security policy to determine if the user is able to submit the document for conversion, or of the document itself is allowed to be converted. Upon receipt of the document 107, the cloud-based network 115 can convert the document 107 into an appropriate printable format, and transmit a converted document 310 to the print engine 110, as shown in FIG. 3 as 306. Upon receipt of the converted document 310, the print engine 110 can render the converted document 310, as appropriate.

Figure 4:
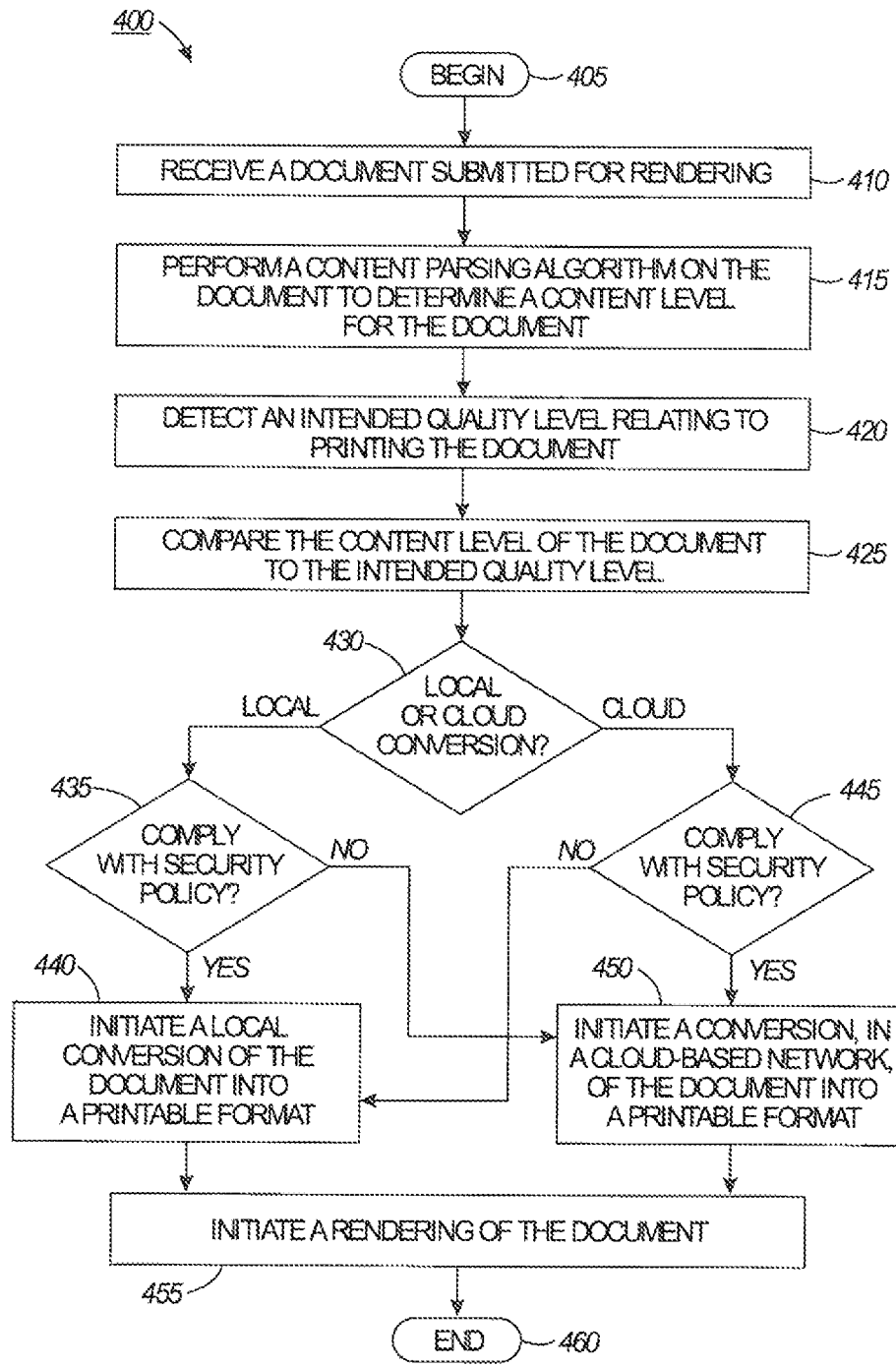
FIG. 4 illustrates an exemplary flow diagram of processing documents in accordance with embodiments.

Referring to FIG. 4, depicted is a flowchart detailing a technique 400 used to determine where to convert documents submitted for printing. The technique 400 as depicted in FIG. 4 can be performed by the mobile device 105, the processing module 112, the print engine 110, and/or other entities or resources. It should be readily apparent to those of ordinary skill in the art that the flow diagram depicted in FIG. 4 represents a generalized illustration and that other steps can be added or existing steps can be removed or modified.

In 405, processing can begin. In 410, the resource can receive a document submitted for rendering. In embodiments, the document can be submitted for rendering by a user from a mobile device. In 415, the resource can perform a content parsing algorithm on the document to determine a content level of the document. In embodiments, the content level can be assigned based on a defined feature support characteristics map, or based on other metrics. In 420, the resource can detect an intended quality level relating to rendering the document. In embodiments, the intended quality level can be received from or specified by the user who submitted the document for rendering.

In 425, the resource can compare the content level of the document to the intended quality level. In embodiments, the intended quality level can be input by the user, or can be set from a user pre-determined default level, if an over-riding input was not generated, to simplify the print workflow. In embodiments, the comparison can be performed by examining a lookup table that maps possible content levels and intended quality levels. In 430, the processing can determine whether the document is to be converted locally or in a cloud-based network. In embodiments, the determination can be based on a result of the comparison. For example, the lookup table can specify either a local or cloud-based conversion based on the content level and the intended quality level. If the document is to be converted locally (435, Local), then the processing module can determine if the conversion decision complies with a security policy. For example, the security policy can be document-based, user-based, or other type of security policy. If the conversion decision complies with the security policy (440, Yes), then the processing module can initiate a local conversion of the document into a printable format.

In contrast, if the security policy overrides the conversion decision (450, No), then the processing module can initiate a conversion, in a cloud-based network, of the document into a printable format. In embodiments, the security policy may not allow for either a local or a cloud conversion of the document. Referring back to 430, if the document is to be converted in the cloud-based network (445, Cloud), then the processing module can determine if the conversion decision complies with a security policy. If the conversion decision complies with the security policy (450, Yes), then the processing module can initiate a conversion, in the cloud-based network, of the document into a printable format. In embodiments, the processing module can transmit or otherwise provide the document to any type of cloud-based network via any type of network connection. In contrast, if the security policy overrides the conversion decision (440, No), then the processing module can initiate a local conversion of the document into a printable format. In embodiments, the security policy may not allow for either a local or a cloud conversion of the document. In 455, the processing module can initiate a rendering of the document after the conversion, at any print device or engine. In 460, the processing can end, repeat, or return to any of the previous steps.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing documents including determining whether to convert the document into a printable electronic format using a local converter or a remote converter, wherein the remote converter is included in a cloud-based network, the method comprising:
   storing a decision mapping table cross-referencing three quality levels with three content levels; wherein the three quality levels are: functional quality level suitable for text only documents, normal office quality level for normal usage documents, and presentation quality level representing features of an underlying document;
   wherein the three content levels are:
      a first content level of the three content levels comprising content with at least one of a break, a specified font, a bullet, numbering, a specified page alignment, a field, a column, or a specified paragraph format,
      a second content level of the three content levels comprising content with at least one of a spreadsheet, a picture, a background, or a word art, and
      a third content level of the three content levels comprising content with at least one of a document comment, a tracked change, or content from a plug-in;
   wherein the decision mapping table indicates that a presentation quality level and a second content level, a normal quality level and a third content level, and a presentation quality level and a third content level correspond to the remote converter, and the decision mapping table further indicates that remaining quality levels and content levels correspond to the local converter;
   parsing content within a document associated with a mobile device to determine features of the content;
   determining a content level for the document based on the features of the content, wherein the content level for the document is indicative of processing resources required to convert the document to a printable electronic format, wherein the content level for the document consists of one of the three content levels:
      a first content level of the three content levels comprising content with at least one of a break, a specified font, a bullet, numbering, a specified page alignment, a field, a column, or a specified paragraph format,
      a second content level of the three content levels comprising content with at least one of a spreadsheet, a picture, a background, or a word art, and
      a third content level of the three content levels comprising content with at least one of a document comment, a tracked change, or content from a plug-in;
   receiving, at the mobile device, a user selection of an intended quality level relating to rendering the document, wherein the user selects one from among the three quality levels consisting of: functional quality level suitable for text only documents, normal office quality level for normal usage documents, and presentation quality level representing features of an underlying document;
   providing, by a processor and based on the content level for the document and the intended quality level, a determination on whether to use a local converter or a remote converter to convert the document into the printable electronic format, wherein the local converter is locally accessible by the mobile device and the remote converter is remotely accessible by the mobile device, wherein the providing a determination on whether to use a local converter or a remote converter comprises examining the decision mapping table.

2. The method of claim 1, wherein the local converter is included in at least one of the mobile device, a print engine locally accessible by the mobile device, or a third-party processing module locally accessible by the mobile device.

3. The method of claim 1, further comprising:
   determining whether the determination to use either the local converter or the remote converter to convert the document complies with a security policy.

4. The method of claim 1, further comprising:
   initiating, without downloading a printer driver onto the mobile device, conversion of the document into the printable electronic format using either the local converter or the remote converter based on the determination; and
   initiating a rendering, by a print engine, of the document that was converted.

5. A system for processing documents including for determining whether to convert the document into a printable electronic format using a local converter or a remote converter, wherein the remote converter is included in a cloud-based network, comprising:
   a mobile device configured to access a document;
   a print engine configured to render a printable version of the document;
   a stored decision mapping table cross-referencing three quality levels with three content levels; wherein the three quality levels are: functional quality level suitable for text only documents, normal office quality level for normal usage documents, and presentation quality level representing features of an underlying document;
   wherein the three content levels are:
      a first content level of the three content levels comprising content with at least one of a break, a specified font, a bullet, numbering, a specified page alignment, a field, a column, or a specified paragraph format,
      a second content level of the three content levels comprising content with at least one of a spreadsheet, a picture, a background, or a word art, and
      a third content level of the three content levels comprising content with at least one of a document comment, a tracked change, or content from a plug-in;
   wherein the decision mapping table indicates that a presentation quality level and a second content level, a normal quality level and a third content level, and a presentation quality level and a third content level correspond to the remote converter, and the decision mapping table further indicates that remaining quality levels and content levels correspond to the local converter; and
   a processor configured to interface with the mobile device and the printer, the processor configured to perform actions comprising:
      parsing content within the document to determine features of the content;
      determining a content level for the document based on the features of the content, wherein the content level for the document is indicative of processing resources required to convert the document to a printable electronic format, wherein the content level for the document consists of one of the three content levels:
         a first content level of the three content levels comprising content with at least one of a break, a specified font, a bullet, numbering, a specified page alignment, a field, a column, or a specified paragraph format, a second content level of the three content levels comprising content with at least one of a spreadsheet, a picture, a background, or a word art, and a third content level of the three content levels comprising content with at least one of a document comment, a tracked change, or content from a plug-in;

receiving, at the mobile device, a user selection of an intended quality level relating to rendering the document by the print engine, wherein the user selects one from among the three quality levels consisting of: functional quality level suitable for text only documents, normal office quality level for normal usage documents, and presentation quality level representing features of an underlying document;

providing, based on the content level for the document and the intended quality level, a determination on whether to use a local converter or a remote converter to convert the document into the printable electronic format, wherein the local converter is locally accessible by the mobile device and the remote converter is remotely accessible by the mobile device, wherein the providing a determination on whether to use a local converter or a remote converter comprises examining the decision mapping table.

6. The system of claim 5, wherein the local converter is included in at least one of the mobile device, a print engine locally accessible by the mobile device, or a third-party processing module locally accessible by the mobile device.

7. The system of claim 5, the processor is further configured to perform actions comprising:
determining whether the determination to use either the local converter or the remote converter to convert the document complies with a security policy.

8. The system of claim 5, wherein the processor is further configured to perform actions comprising:
initiating, without downloading a printer driver onto the mobile device, conversion of the document into the printable electronic format using either the local converter or the remote converter based on the determination; and
initiating a rendering, by the print engine, of the document that was converted.

9. A non-transitory computer-readable storage medium comprising instructions for causing a computer to perform actions for processing a document including determining whether to convert the document into a printable electronic format using a local converter or a remote converter, wherein the remote converter is included in a cloud-based network, the actions comprising:
storing a decision mapping table cross-referencing three quality levels with three content levels; wherein the three quality levels are: functional quality level suitable for text only documents, normal office quality level for normal usage documents, and presentation quality level representing features of an underlying document;
wherein the three content levels are:
a first content level of the three content levels comprising content with at least one of a break, a specified font, a bullet, numbering, a specified page alignment, a field, a column, or a specified paragraph format, a second content level of the three content levels comprising content with at least one of a spreadsheet, a picture, a background, or a word art, and a third content level of the three content levels comprising content with at least one of a document comment, a tracked change, or content from a plug-in;

wherein the decision mapping table indicates that a presentation quality level and a second content level, a normal quality level and a third content level, and a presentation quality level and a third content level correspond to the remote converter, and the decision mapping table further indicates that remaining quality levels and content levels correspond to the local converter;

parsing content within a document to determine features of the content;

determining a content level for the document based on the features of the content, wherein the content level for the document is indicative of processing resources required to convert the document to a printable electronic format, wherein the content level for the document consists of one of the three content levels:

a first content level of the three content levels comprising content with at least one of a break, a specified font, a bullet, numbering, a specified page alignment, a field, a column, or a specified paragraph format, a second content level of the three content levels comprising content with at least one of a spreadsheet, a picture, a background, or a word art, and a third content level of the three content levels comprising content with at least one of a document comment, a tracked change, or content from a plug-in;

receiving, at a mobile device, a user selection of an intended quality level relating to rendering the document, wherein the user selects one from among the three quality levels consisting of: functional quality level suitable for text only documents, normal office quality level for normal usage documents, and presentation quality level representing features of an underlying document;

providing, based on the content level for the document and the intended quality level, a determination on whether to use a local converter or a remote converter to convert the document into the printable electronic format, wherein the local converter is locally accessible by the mobile device and the remote converter is remotely accessible by the mobile device, wherein the providing a determination on whether to use a local converter or a remote converter further comprises examining the decision mapping table.

10. The computer-readable storage medium of claim 9, wherein the local converter is included in at least one of the mobile device, a print engine locally accessible by the mobile device, or a third-party processing module locally accessible by the mobile device.

11. The computer-readable storage medium of claim 9, wherein the computer further performs actions comprising:
initiating, without downloading a printer driver onto the mobile device, conversion of the document into the printable electronic format using either the local converter or the remote converter based on the determination; and
initiating a rendering, by a print engine, of the document that was converted.

* * * * *